3,190,903
ORGANOSILOXYALKYL ETHERS OF
POLYHYDRIC ALCOHOLS
Horst Köpnick, Cologne-Stammheim, and Detlef Delfs, Opladen, Germany, assignors to Farbenfabriken Bayer Aktiengesellschaft, Leverkusen, Germany, a corporation of Germany
No Drawing. Filed Mar. 7, 1962, Ser. No. 177,961
Claims priority, application Germany, Mar. 24, 1961, F 33,501
9 Claims. (Cl. 260—448.8)

The invention relates to organosiloxyalkyl ethers of polyhydric alcohols and a process for their production.

According to our copending application Serial No. 75,113, filed December 12, 1960, now U.S. Patent No. 3,040,080, granted June 19, 1962, by Horst Köpnick, Detlef Delfs and Walter Simmler, organosiloxy-methyl alkanes of the general formula

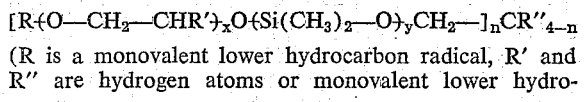

(R is a monovalent lower hydrocarbon radical, R' and R" are hydrogen atoms or monovalent lower hydrocarbon radicals, $x$ is an integer greater than 3, $y$ is an integer greater than 2, $n$ is 3 or 4), are produced by heating to temperatures between 50 and 300° C. a hydroxymethyl alkane of the general formula $$(HO-CH_2-)_n CR''_{4-n}$$

a dialkoxy polydimethyl siloxane of the general formula $$R'''-O-(Si(CH_3)_2-O)_y R'''$$

(R''' is a lower alkyl radical) and a polyalkylene glycol monoalkyl ether of the general formula $$R(O-CH_2-CHR')_x OH$$

in the presence of at least 0.05 percent (referred to the total weight of the reaction components) of an acid catalyst and with driving off the alcohol R'''OH formed in the reaction, and isolating by known methods the reaction product after neutralizing the catalyst.

By further elaborating this process, it has now been found that even more suitable products being in particular substantially more stable to the action of chemicals and hydrolysis, are obtained by using, instead of the hydroxymethyl alkanes there employed, polyols modified by alkoxylation and obtainable in known manner by the addition of alkylene oxides to polyhydric alcohols. In this process, the carbon chain of these polyhydric alcohols (a) may be branched as, e.g., in the case of 1,1,1-tris-(hydroxymethyl)-alkanes and pentaerythritol, or (b) unbranched as, e.g., in the case of ethylene glycol, glycerol and sorbitol. To the last-mentioned group (b) also belong alkyl-substituted glycols as 1,2-dihydroxypropane, pinacol as well as polymethylene glycols as 1,3-dihydroxypropane, and other linear polyhydroxy alkanes as 1,2,6-trihydroxy-hexane. However, in order to obtain a better survey, the more detailed description given below considers only the alkoxylated polyols of the general formulae (a) $(HO-CHR'-CHR'-O-CH_2-)_n CR''_{4-n}$ and (b) 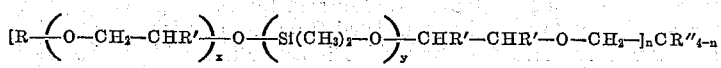

wherein R' and R" denote hydrogen atoms or monovalent lower hydrocarbon radicals, $n$ is one of the numbers 3 and 4, and $z$ denotes a whole number which may also be zero. With the same good result as the uniform hydroxy-alkoxy alkanes of the aforesaid formulae there may also be used in the process the alkoxylation products of mixtures of a branched and a linear polyhydric alcohol.

The compounds produced according to the invention from the polyols of the Formulae (a) and (b) are organosiloxyalkyl ethers of the general formulae

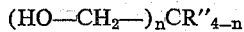

and

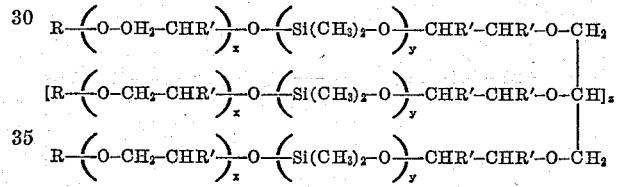

wherein R denotes a monovalent lower hydrocarbon radical, $x$ is a whole number greater than 3, and $y$ a whole number greater than 2 (R' R", $n$ and $z$ as defined above). They are obtained by transesterifying an α,ω-dialkoxy-polydimethyl-siloxane at the one end of the siloxane chain with one of the aforesaid alkoxylated polyols, and at the other end with a polyalkylene glycol monoalkyl ether in the presence of an acid catalyst at temperatures between 50 and 300° C. The last-mentioned ethers of the general formula $$R(O-CH_2-CHR')_x OH$$

may contain different radicals R' in a polyalkylene oxide chain, i. e., they may be copolymerized in known manner from several alkylene oxides, for example by a combination of ethylene oxide with propylene oxide, butylene oxide and or styrene oxide.

The process may be carried out in one step, but advantageously also in two steps. In the first-mentioned case a polyalkylene glycol monoalkyl ether, an α,ω-dialkoy - polydimethyl - siloxane and one of the aforesaid alkoxylated polyols or polyol mixtures are mixed with one another, whereby the proportions are determined in each case dependent on the polyol chosen in accordance with the appropriate equation of the two following reaction equations (R′′′ denotes a lower alkyl radical; R, R′, R′′, $n$, $x$, $y$ and $z$ as defined above)

(1)

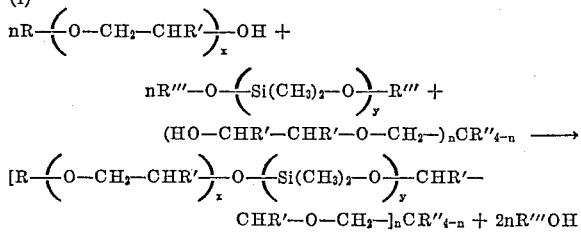

(2)

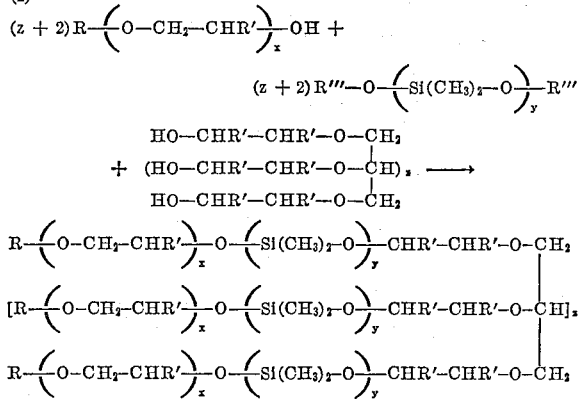

At least 0.05 percent by weight of a fluorinated fatty acid and an amount of toluene or xylene approximately equal to the weight of the mixture are added to this mixture as solvent whilst refluxing this solvent and simultaneously distilling off the R′′′OH formed thereby until the amount of this alcohol calculated from the reaction equation is evaporated. The residue is neutralized with sodium hydrogen carbonate, organic bases or magnesium oxide, the solvent is distilled off under vacuum, and the residue is filtered off. An organosiloxyalkyl ether corresponding to the formulae indicated above remains as a colorless oil.

The process is carried out in two steps by mixing and heating first the polysiloxane with the alkoxylated polyol and a catalyst, preferably a fluorinated, especially perfluorinated fatty acid in an amount of at least 0.05 percent by weight of the reaction mixture in a proportion that, according to the reaction equations listed below, about half of the alkoxy groups remain at the polysiloxane and the remainder is evaporated as alcohol R′′′OH. Dependent upon the alkoxylated polyol chosen, the appropriate equation of the two following equations has to be taken into consideration (R′′, R′′′, $n$, $y$ and $z$ as defined above).

(1)

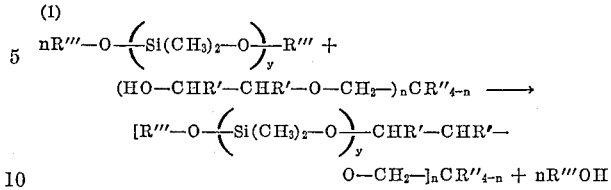

(2)

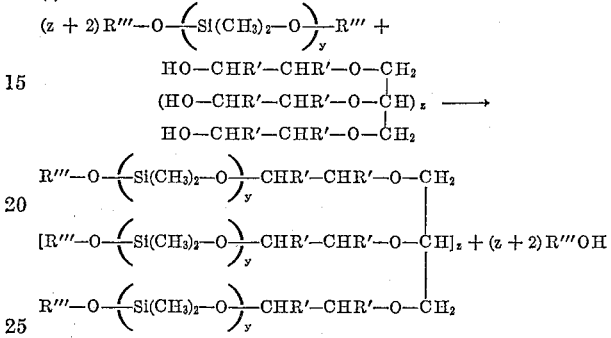

In addition to the aforesaid components, toluene or xylene may be added to the reaction mixture as inert solvent in order to attain a more rapid homogenization and to prevent overheating; heating is then effected under reflux. The remaining siloxyalkyl ether of this first step may be isolated, if desired, in the form of a viscous oil after neutralizing the catalyst and filtering off the salt formed thereby; in the second step, the ether is further transesterified by heating it to the boil under reflux with a polyalkylene glycol monoalkyl ether in the presence of an acid catalyst and an inert solvent, both of which may be the same as in the first transesterification stop; this may be done according to one of the two following reaction equations (R, R′, R′′, R′′′, $n$, $x$, $y$ and $z$ as defined above) relevant in each case:

(1)

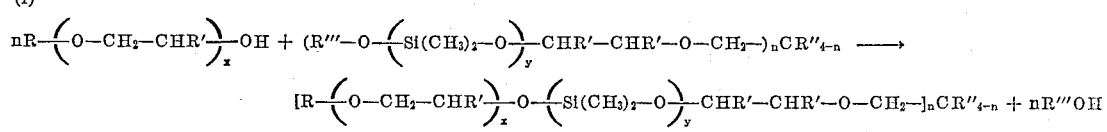

(2)

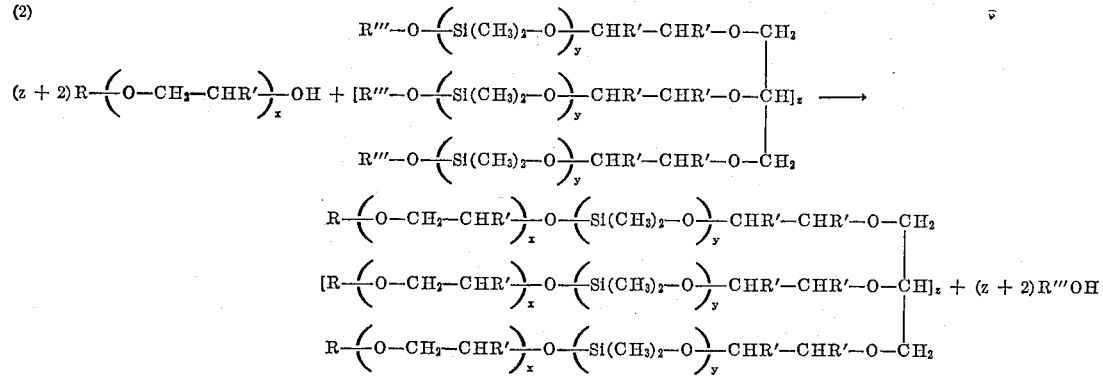

The amount of solvent is chosen so that it corresponds to the order of the total weight of the reacting components. The reflux cooling is adjusted such that the alcohol R′′′OH is distilled off, and heating is terminated when the amount of alcohol calculated according to the reaction equation is evaporated. The operation is further carried out as described for the one-step process.

The two-step method of carrying out the process according to the invention may also be varied in such a manner that the two reactants of the dialkyl-polydimethylsiloxane in the sequence of the reactions were changed with another, but otherwise operating in analogous manner to that described above.

According to all three methods of carrying out the process homogeneous liquid products are obtained. In particular, no formation occurs of such compounds in which both ends of the siloxane chain are esterified with the same alcohol radicals, a formation which was initially to be expected together with other faulty reactions and which may proceed with transesterification of the primary reaction products.

The new siloxane compounds obtained according to the process of the invention, similarly to those produced according to our aforementioned copending application Ser. No. 75,113, now U.S. Patent No. 3,040,080, granted June 19, 1962, have the property of being hydrophilic as well as being soluble to a high degree in fats and hydrocarbon oils and thus being very suitable for the use in cosmetic preparations. In ointments and cream-like preparations for the protection and care of the human skin organopolysiloxane compounds are known to increase the gliding property and thus to promote the application of thin layers and the rubbing in of the preparations. If water-containing dispersions are concerned, it is advantageous that the siloxane compound is soluble in the oily constituent of the preparation customarily added in these cases in quantities of about 1 to 3 percent by weight, so that after evaporation or resorption of the water a homogeneous film remains on the skin, and, moreover, the siloxane compound imparts to the oil or fat a hydrophilic property required for the formation of a good emulsion that is to say it has a certain emulsifying action. The aim of combining these two properties in one organopolysiloxane compound is attained by the products according to the invention together with the additional advantage as compared with the products according to copending application Ser. No. 75,113, now U.S. Patent No. 3,040,080, granted June 19, 1962 that they exhibit a substantially improved resistance to chemicals and hydrolysis, as already mentioned in the introduction.

The following examples are given for the purpose of illustrating the invention.

*Example 1*

A mixture is prepared from 3.5 litres of toluene,
129 g. of 1,2-bis-($\beta$-hydroxy-propoxy)-ethane,
1048 g. of $\alpha,\omega$-diethoxy-polydimethyl-siloxane of a mean molecular weight of 815, containing 11 percent by weight of ethoxy radicals and corresponding approximately to decasiloxane,
2500 g. of the anhydrous mono-n-butyl ether of a polypropylene glycol with an OH-number of 29, and
15 g. of trifluoroacetic acid.

The mixture is boiled under reflux for four to five hours. It thus becomes homogeneous, whilst the calculated amount of ethanol (117 g.) is distilled off together with toluene. It is subsequently neutralized with a $\beta$-hydroxyethylamine in a slight excess, the solvent is distilled therefrom under reduced pressure, and the residual product is filtered. 3400 g. of 1,2-bis-[$\beta$-(n-butoxy-polypropoxy-polydimethyl-siloxy)-propoxy]-ethane are obtained as a colorless oily filtrate of a viscosity of 750 cp. (20° C.) which no longer contains hydroxyl groups and which dissolves completely in castor oil, turpentine oil and linseed oil, to 1.2 percent by volume in petroleum (Vaseline) oil and to 3 percent by volume in mineral oil.

*Example 2*

A mixture is prepared from 1.3 litres of toluene,
124 g. of 1,2,3,4,5,6-hexakis-($\beta$-hydroxy-propoxy)-hexane,
1048 g. of $\alpha,\omega$-diethoxy-polydimethyl-siloxane of a mean molecular weight of 815 corresponding to decasiloxane, and
12 g. of trifluoro-acetic acid.

The mixture is heated until 95% (57 g.) of the calculated amount of ethanol are distilled off. 2500 g. of the anhydrous mono-n-butyl ether of a polyalkylene glycol are then added whose alkylene oxide units consist of ethylene oxide and propylene oxide in a ratio by weight of 1:1, and whose OH-number is 30, furthermore 2.5 litres of toluene and 5 g. of trifluoro-acetic acid, and the mixture thus obtained is boiled under reflux of the toluene until the calculated total amount of ethanol is driven off. The residual solution is neutralized with sodium hydrogen carbonate, the solvent is distilled off under reduced pressure, and the residue is filtered. 1,2,3,4,5,6-hexakis-[$\beta$-(n-butoxy - polyethoxy - propoxy - polydimethyl - siloxy)-propoxy]-hexane having a viscosity of 2200 cp. (20° C.) is obtained as a colorless oily filtrate.

*Example 3*

A mixture is prepared from 1.3 litres of toluene,
128 g. of 1,1,1-tris-($\beta$-hydroxy-propoxy-methyl)-ethane,
650 g. of $\alpha,\omega$-diethoxy-polydimethyl-siloxane with a mean molecular weight of 510, approximately corresponding to hexasiloxane, and
10 g. of monofluoro-acetic acid.

The mixture is boiled under reflux for 20 to 30 minutes, whereby the calculated amount of ethanol (59 g.) distils off together with some toluene. To the homogeneous reaction mixture there is then added the solution of 2500 g. of the anhydrous monomethyl ether of a polyalkylene glycol whose alkylene oxide units consist of ethylene oxide and propylene oxide in a ratio by weight of 1:1, and whose OH-number is 29, in 2.5 litres of toluene, a further 10 g. of monofluoro-acetic acid are added and the mixture thus obtained is boiled under reflux until the whole ethyl alcohol is distilled off. It is then neutralized with magnesium oxide, the solvent distilled off under reduced pressure, and the residual product is filtered. 3000 g. of 1,1,1-tris-[$\beta$-(methoxy - polyethoxy - propoxy - polydimethyl - siloxy)-propoxy-methyl]-ethane are obtained as a colorless oily filtrate having a viscosity of 1200 cp. (20° C.).

*Example 4*

A mixture is prepared from 1.3 litres of toluene,
122 g. of an equimolar mixture of 1,1,1-tris-($\beta$-hydroxy-propoxy-methyl)-propane, and 1,2,3-tris-($\beta$-hydroxy-propoxy)-propane,
1058 g. of $\alpha,\omega$-diethoxy-polydimethyl-siloxane of a mean molecular weight of 790 containing 11.1 percent by weight of ethoxy radicals and approximately corresponding to decasiloxane, and
6 g. of trifluoro-acetic acid.

The mixture is boiled under reflux for 30 minutes, whereby 90% (53 g.) of the calculated amount of ethanol distils off. There is then added to the reaction mixture the solution of 2320 g. of the anhydrous mono-iso-propyl ether of a polyalkylene glycol whose alkylene oxide units consist of ethylene oxide and propylene oxide in a ratio by weight of 4:1, and whose OH-number is 43, in 2.5 litres of toluene, further 15 g. of trifluoro-acetic acid, and the mixture thus obtained is boiled under reflux until the whole ethanol is distilled off. The solution boiling under reflux is then neutralized with sodium hydrogen carbonate, the solvent is distilled off under reduced pressure and the residual product is filtered. The filtrate is a colorless oil having a viscosity of 750 cp. at 25° C.

Example 5

A mixture is prepared from 2.5 litres of toluene,
650 g. of α,ω-diethoxy-polydimethyl-siloxane of a mean molecular weight of 510 approximately corresponding to hexasiloxane,
2500 g. of the anhydrous monoethyl ether of a polyalkylene glycol whose alkylene oxide units consist of ethylene oxide and propylene oxide in a ratio by weight of 3:2, and whose OH-number is 30, and
10 g. of trifluoro-acetic acid.

The mixture is boiled until the calculated amount of ethanol (59 g.) is distilled off together with some toluene. To the now homogeneous solution there are added 127 g. of tetrakis-(β-hydroxy-propoxy-methyl)-methane, a further 1.5 litres of toluene and 5 g. of trifluoro-acetic acid, and the mixture is boiled until the whole ethanol is distilled off. The solution is then neutralized with magnesium oxide, the solvent is distilled off under reduced pressure, and the residual product is filtered. Tetrakis-[β-(ethoxy-polyethoxy-propoxy - polydimethyl - siloxy)-propoxy-methyl]-methane is obtained as a colorless oily filtrate having a viscosity of 1720 cp. (20° C.).

We claim:

1. An organosiloxy alkoxy alkane selected from the group consisting of compounds of the formula:

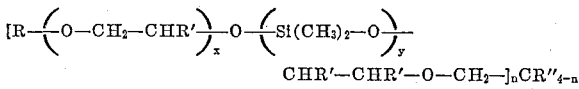
CHR'—CHR'—O—CH$_2$—]$_n$CR''$_{4-n}$ and

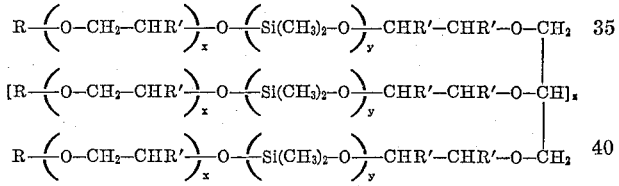

wherein R represents a monovalent lower alkyl radical, R' represents a member selected from the group consisting of hydrogen and monovalent lower alkyl radicals, R'' represents a member selected from the group consisting of hydrogen and monovalent lower alkyl radicals, x is an integer greater than 3, y is an integer greater than 2, n is one of the integers 3 and 4, and z is an integer including zero.

2. An organosiloxy alkoxy alkane of the general formula

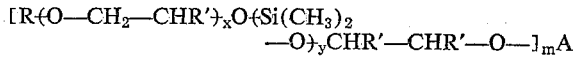

wherein R represents a monovalent lower alkyl radical, each R' represents a member of the group consisting of hydrogen and monovalent lower alkyl radicals, x is an integer greater than 3, y and m are each integers greater than 2 and A represents an at least divalent saturated aliphatic hydrocarbon radical of the formula

wherein z is an integer including zero.

3. An organosiloxy alkoxy alkane of the general formula

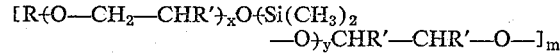

wherein R represents a monovalent lower alkyl radical, each R' represents a member of the group consisting of hydrogen and monovalent lower alkyl radicals, x is an integer greater than 3, y is an integer of from 3 to 10, m is an integer of from 2 to 6 and A represents a di- to hexa-valent saturated aliphatic hydrocarbon radical of the formula —CH$_2$—(CH)$_z$—CH$_2$— wherein z is an integer including zero.

4. Organosiloxy alkoxy alkanes of the general formula

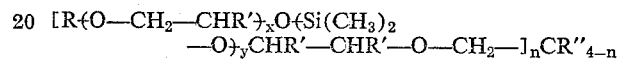

wherein R represents a monovalent lower alkyl radical, R' represents a member selected from the group consisting of hydrogen and monovalent lower alkyl radicals, R'' represents a member selected from the group consisting of hydrogen and monovalent lower alkyl radicals, x is an integer greater than 3, y is an integer greater than 2, and n is one of the integers 3 and 4.

5. Organosiloxy alkoxy alkanes of the general formula

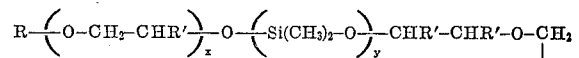

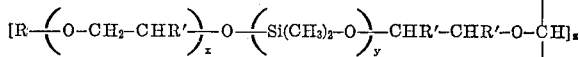

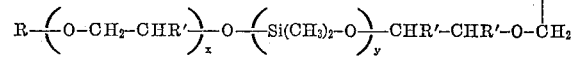

wherein R represents a monovalent lower alkyl radical, R' represents a member from the group consisting of hydrogen and monovalent lower alkyl radicals, x is an integer greater than 3, y is an integer greater than 2, n is one of the integers 3 and 4, and z is an integer including zero.

6. 1,2-bis-[β-(n-butoxy - polypropoxy - polydimethyl-siloxy)-propoxy]-ethane.

7. 1,2,3,4,5,6-hexakis-[β-(n-butoxy - polyethoxy - propoxy-polydimethyl-siloxy)-propoxy]-hexane.

8. 1,1,1-tris-[β-(methoxy-polyethoxy-propoxy - polydimethyl-siloxy)-propoxy-methyl]-ethane.

9. Tetrakis-[β-(ethoxy-polyethoxy - propoxy - polydimethyl-siloxy)-propoxy-methyl]-methane.

References Cited by the Examiner
UNITED STATES PATENTS 2,917,480  12/59  Bailey et al. _____ 260—448.8
3,040,080   6/62  Kopnick et al. _____ 260—448.8

TOBIAS E. LEVOW, *Primary Examiner.*